United States Patent
Roth et al.

(10) Patent No.: US 10,366,358 B1
(45) Date of Patent: Jul. 30, 2019

(54) BACKLOGGED COMPUTING WORK EXCHANGE

(71) Applicant: Amazon Technologies, Inc., Seattle, WA (US)

(72) Inventors: Gregory Branchek Roth, Seattle, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 14/577,693

(22) Filed: Dec. 19, 2014

(51) Int. Cl.
| | |
|---|---|
| G06F 9/46 | (2006.01) |
| G06Q 10/06 | (2012.01) |
| G06F 9/50 | (2006.01) |
| G06Q 20/06 | (2012.01) |
| G06Q 30/08 | (2012.01) |

(52) U.S. Cl.
CPC ..... G06Q 10/06316 (2013.01); G06F 9/5005 (2013.01); G06Q 20/06 (2013.01); G06Q 30/08 (2013.01)

(58) Field of Classification Search
CPC .................................................. G06F 9/4881
USPC ......................................................... 718/102
See application file for complete search history.

(56) References Cited

U.S. PATENT DOCUMENTS

| | | | |
|---|---|---|---|
| 6,738,386 B1 | 5/2004 | Holmqvist | |
| 6,968,323 B1 * | 11/2005 | Bansal | G06Q 10/06 370/230 |
| 7,269,652 B2 * | 9/2007 | Chen | G06F 9/505 709/203 |
| 7,716,275 B1 * | 5/2010 | Nagaralu | G06F 9/5011 709/203 |
| 7,765,301 B1 * | 7/2010 | Kimbrel | G06F 9/50 705/7.25 |
| 8,015,327 B1 | 9/2011 | Zahavi et al. | |
| 8,127,014 B2 | 2/2012 | Gulati et al. | |
| 8,327,103 B1 | 12/2012 | Can et al. | |
| 8,533,103 B1 * | 9/2013 | Certain | G06Q 10/06 705/35 |
| 8,539,493 B1 | 9/2013 | Robertson et al. | |
| 8,756,322 B1 * | 6/2014 | Lynch | H04L 12/5695 709/226 |
| 8,826,280 B1 | 9/2014 | Robertson et al. | |
| 9,336,551 B1 * | 5/2016 | Hegg | G06Q 30/08 |
| 9,465,645 B1 * | 10/2016 | Roth | G06F 9/46 |
| 2002/0174227 A1 * | 11/2002 | Hartsell | H04L 12/5695 709/226 |
| 2003/0101213 A1 * | 5/2003 | Wright | H04L 29/06 709/203 |
| 2004/0019624 A1 | 1/2004 | Sukegawa | |

(Continued)

*Primary Examiner* — Mehran Kamran
(74) *Attorney, Agent, or Firm* — Davis Wright Tremaine LLP

(57) ABSTRACT

A method and apparatus for providing a backlogged computing work exchange are provided. In the method and apparatus, a computer system receives a request, whereby satisfaction of the request requires enqueuing computing work, The computer system determines a queued computing work quota of a plurality of queued computing work quotas for use in enqueuing the computing work and submits the request for execution, whereby the request is associated with a second client and the queued computing work quota of the plurality of queued computing work quotas is associated with a first client different from the second client.

19 Claims, 7 Drawing Sheets

(56) References Cited

U.S. PATENT DOCUMENTS

| | | |
|---|---|---|
| 2004/0081093 A1 | 4/2004 | Haddock et al. |
| 2004/0117791 A1 | 6/2004 | Prasad et al. |
| 2004/0194095 A1 | 9/2004 | Lumb et al. |
| 2004/0250250 A1* | 12/2004 | Hamilton, II ......... G06F 9/5083 718/102 |
| 2005/0125508 A1* | 6/2005 | Smith ................. H04L 67/1002 709/220 |
| 2006/0034438 A1* | 2/2006 | O'Neill ................... H04L 12/14 379/114.07 |
| 2006/0036520 A1* | 2/2006 | O'Neill ................... G06Q 30/04 705/34 |
| 2006/0085544 A1* | 4/2006 | Chen ....................... G06F 9/505 709/226 |
| 2006/0167703 A1* | 7/2006 | Yakov ..................... B23K 1/0016 705/26.1 |
| 2006/0190482 A1* | 8/2006 | Kishan .................... G06F 9/485 |
| 2007/0160080 A1* | 7/2007 | Sugauchi .............. G06F 9/5027 370/468 |
| 2007/0256077 A1 | 11/2007 | Zhong |
| 2007/0277173 A1 | 11/2007 | Tokimoto et al. |
| 2007/0299763 A1* | 12/2007 | Yoshida ................. G06Q 10/06 705/37 |
| 2008/0222640 A1 | 9/2008 | Daly et al. |
| 2009/0007125 A1* | 1/2009 | Barsness ............... G06F 9/5077 718/104 |
| 2009/0019450 A1 | 1/2009 | Mori et al. |
| 2009/0063437 A1 | 3/2009 | Hendrey et al. |
| 2009/0113432 A1 | 4/2009 | Singh et al. |
| 2009/0193121 A1 | 7/2009 | Shin |
| 2009/0235257 A1 | 9/2009 | Komatsu et al. |
| 2009/0288090 A1 | 11/2009 | Ujibashi et al. |
| 2010/0049570 A1 | 2/2010 | Li et al. |
| 2010/0083253 A1 | 4/2010 | Kushwaha |
| 2010/0106332 A1* | 4/2010 | Chassin ............... G06Q 20/102 700/278 |
| 2010/0106816 A1 | 4/2010 | Gulati et al. |
| 2010/0229218 A1 | 9/2010 | Kumbalimutt et al. |
| 2010/0241751 A1 | 9/2010 | Sonoda et al. |
| 2010/0299669 A1 | 11/2010 | O'Cull et al. |
| 2011/0119413 A1 | 5/2011 | Gulati et al. |
| 2011/0131580 A1 | 6/2011 | Krishnamurthy et al. |
| 2011/0138055 A1* | 6/2011 | Daly ....................... G06F 9/505 709/226 |
| 2011/0202924 A1 | 8/2011 | Banguero et al. |
| 2011/0225016 A1* | 9/2011 | Boss ....................... G06Q 10/06 705/7.25 |
| 2011/0238460 A1* | 9/2011 | Al-Dawsari ........... G06Q 10/06 705/7.31 |
| 2011/0264482 A1* | 10/2011 | Rahmouni ............. G06Q 10/06 705/7.26 |
| 2012/0044828 A1* | 2/2012 | Seo ..................... H04B 7/15521 370/252 |
| 2012/0079492 A1 | 3/2012 | Chambliss et al. |
| 2012/0096271 A1 | 4/2012 | Ramarathinam et al. |
| 2012/0117075 A1 | 5/2012 | Gokulakannan |
| 2012/0124591 A1 | 5/2012 | Cadambi et al. |
| 2012/0159507 A1 | 6/2012 | Kwon et al. |
| 2012/0227052 A1 | 9/2012 | Larson et al. |
| 2013/0042250 A1 | 2/2013 | Lim et al. |
| 2013/0070283 A1 | 3/2013 | Ikawa et al. |
| 2013/0139172 A1 | 5/2013 | An et al. |
| 2013/0185667 A1 | 7/2013 | Harper et al. |
| 2013/0219395 A1 | 8/2013 | Geibel et al. |
| 2013/0232261 A1 | 9/2013 | Wright et al. |
| 2013/0346992 A1 | 12/2013 | Sonoyama et al. |
| 2014/0025828 A1 | 1/2014 | Li et al. |
| 2014/0059551 A1 | 2/2014 | Umanesan |
| 2014/0067496 A1* | 3/2014 | Buswell ................. G06Q 30/08 705/14.4 |
| 2014/0075032 A1* | 3/2014 | Vasudevan ............ G06F 9/5072 709/226 |
| 2014/0156853 A1 | 6/2014 | Suda et al. |
| 2014/0165067 A1 | 6/2014 | Fiacco et al. |
| 2014/0237468 A1 | 8/2014 | Desai et al. |
| 2014/0237477 A1 | 8/2014 | Cadambi et al. |
| 2014/0282512 A1 | 9/2014 | Pacheco et al. |
| 2014/0297833 A1 | 10/2014 | Bedini et al. |
| 2014/0358710 A1* | 12/2014 | Balestrieri ......... G06Q 30/0601 705/26.1 |
| 2015/0006716 A1* | 1/2015 | Suchter ................ G06F 9/5038 709/224 |
| 2015/0033242 A1 | 1/2015 | Stepanchuk |
| 2015/0046279 A1* | 2/2015 | Wang .................... G06F 9/5027 705/26.3 |
| 2015/0113540 A1 | 4/2015 | Rabinovici et al. |
| 2015/0121388 A1 | 4/2015 | Chang et al. |
| 2015/0128149 A1 | 5/2015 | Meijer et al. |
| 2015/0135183 A1 | 5/2015 | Kipp |
| 2015/0150014 A1 | 5/2015 | Sar et al. |
| 2015/0188840 A1* | 7/2015 | Xiao ......................... G06F 9/50 709/226 |
| 2015/0236973 A1 | 8/2015 | Jackson |
| 2015/0254191 A1 | 9/2015 | Sukonik et al. |
| 2015/0262106 A1 | 9/2015 | Diao et al. |
| 2016/0028595 A1* | 1/2016 | Ramakrishnan .... H04L 41/5025 709/226 |
| 2016/0101361 A1* | 4/2016 | Scott ..................... A63F 13/822 463/31 |
| 2016/0150076 A1* | 5/2016 | Foladare ................. H04W 4/02 370/259 |
| 2016/0191417 A1* | 6/2016 | Lutz ................... H04W 72/0486 370/336 |

* cited by examiner

BACKLOGGED COMPUTING WORK EXCHANGE

CROSS-REFERENCE TO RELATED APPLICATIONS

This application incorporates by reference for all purposes the full disclosure of co-pending U.S. patent application Ser. No. 14/314,315, filed on Jun. 25, 2014, entitled "MANAGING BACKLOGGED TASKS."

BACKGROUND

Remotely-hosted computing services may be optimally designed to service a large number of customers. The customers may each submit to a computing service requests for the performance of computing tasks resulting. As a result, the resources of computing services become contested. In these multi-tenant computing environments, it is important to provide for a predictable customer experience such that the satisfaction of computing request is not unreasonably delayed. Furthermore, it is also important to ensure fairness such that one customer or a small set of customers do not overwhelm the system and "starve" other customers' of access to the computing resources. Additionally, it is also important to provide the customers with mechanisms to obtain additional computing capacity when needed.

It is often challenging to enable customers of a computing service to obtain additional capacity for backlogged computing work from other customers by trading or exchanging the capacity. It is also challenging to provide a marketplace for exchanging backlogged computing work capacity.

BRIEF DESCRIPTION OF THE DRAWINGS

Various embodiments in accordance with the present disclosure will be described with reference to the drawings, in which.

DETAILED DESCRIPTION

Figure 1:
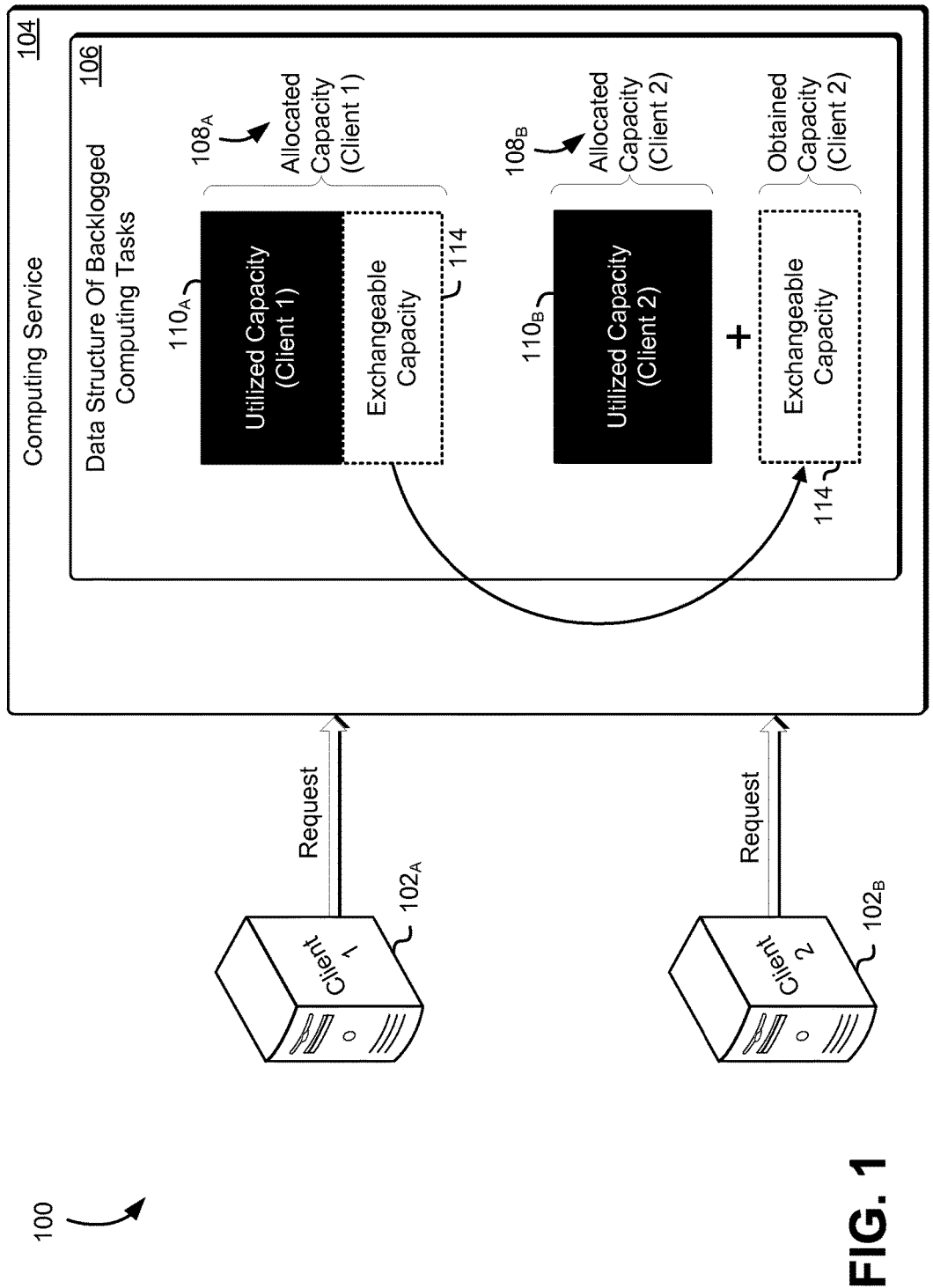
FIG. 1 shows an example of an environment for exchanging backlogged computing work capacity in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enabling a client of a service to exchange some or all of a backlogged computing work capacity allocated to the client. The backlogged computing work capacity may be allocated to the client due at least in part to the fact that the client is a customer of the service. When the client is not utilizing their allocation capacity, the client is permitted to trade or exchange the capacity, whereby the capacity may be reallocated for use by another client, whereby the other client may have an immediate need for the traded capacity. The client may receive a monetary fee in exchange for the traded capacity. Alternatively, the client may trade the capacity in exchange for another portion of the service's capacity to be given for utilization by the client at a later time period.

In some examples, the service as described herein is a remotely-hosted computing service that provides computing functionality to multiple clients. The clients may submit requests to the service, whereby satisfaction of a request requires performing computing tasks. The computing tasks may be backlogged by the service (for example, queued in a queue) and may be executed when computing resources become available to take up their execution. In this multi-tenant environment, the service may be capacity-constrained, whereby the service may have finite computing resources to execute the computing tasks. Further, the one or more tasks may be retained pending execution of other higher priority tasks.

The service may be configured with the backlogged computing work capacity. The backlogged computing work capacity may be a limit of an amount of backlogged computing work that may be retained by the service pending execution at point in time. The amount of backlogged computing work may be measured by a number of operations (such as memory access operations or arithmetic or logical operations, among others) or an approximation thereof that are required to be performed (for example, using number or execution threads of a processor) for the backlogged computing work to be executed. Configuring the service with the backlogged computing work capacity is advantageous in that latency predictability is provided to the clients of the service. Due to the fact that the amount of computing work that is allowed to be backlogged is limited, under normal system operations, there is a maximum amount of time a computing task may be retained pending execution.

The backlogged computing work capacity may be allocated to the clients of the service, for example, by subdividing the backlogged computing work capacity among the clients of the service evenly or according to another allocation technique. Capacity that is allocated to a client may be reserved for utilization by the client. The client may utilize the allocated capacity by having one or more computing tasks of the client be retained by the service pending execution. The one or more computing tasks may require an amount of computing work to be executed. The service may retain the computing tasks pending execution on a condition that the client has an available and unutilized capacity equal to or exceeding the amount of computing work associated with the one or more computing tasks.

The client's available capacity may vary in time. For example, as pending tasks of the client are executed and no longer outstanding, the client's available capacity increases. Conversely, during periods of time where the client actively submits requests to the service whose satisfaction requires executing computing tasks that are backlogged, the client may fully utilize their outstanding capacity. The service may enable the client to purchase a portion of another client's allocated capacity (for example, by paying a monetary fee) for a duration of time or indefinitely as described herein. As a result of the purchase, the service may reallocate the portion of the other client's capacity to the client for utilization. Clients may trade allocated capacity in exchange monetary fees and other instruments, such as tokens. Furthermore, in anticipation of increased or decreased utilization of the service, the clients may swap a present or a future portion of the allocated capacity for another portion tendered for a different duration of time. Secondary markets for capacity may also be enabled that permit trading (for example, by matching bid and ask offers) of capacity or capacity futures.

FIG. 1 shows an example of an environment for exchanging backlogged computing work capacity in accordance with at least one embodiment. In the environment 100, two clients (denoted as 'client 1' and 'client 2' and referred to herein as first client $102_A$ and second client $102_B$, respectively) of a computing service 104 are shown. The clients (collectively referred to herein by the numeral alone) may be customers of the computing service 104, whereby the computing service 104, which may include computing resources such as servers, memory devices and networking devices, among others, performs computing tasks for the clients 102 as described herein. The service 104 may have finite computing resources for performing the computing tasks and may, thus, include a data structure of backlogged computing tasks 106, whereby computing tasks of the clients 102 may be retained pending (or outstanding) execution by the computing resources of the service 104. The data structure of backlogged computing tasks 106 may have finite capacity, whereby the capacity of the data structure of backlogged computing tasks 106 may be a maximum amount of computing work that may be pending execution at a particular point in time.

The capacity of the data structure of backlogged computing tasks 106 may be allocated to the clients 102 of the service 104. As shown in FIG. 1, a first portion $108_A$ of the capacity of the data structure of backlogged computing tasks 106 is allocated to the first client $102_A$ and a second portion $108_B$ of the capacity is allocated to the second client $102_B$. The clients may utilize their allocated capacity $108_A$, $108_E$ referred to herein as utilized capacity $110_A$, $110_E$ by having requested computing tasks await execution by the service 104. For example, if the computing work required to perform a computing task of the first client $102_A$ is relatively small, a corresponding small portion of the allocated capacity $108_A$ of the first client $102_A$ is utilized $110_A$. The remainder of the allocated capacity $108_A$ may be unutilized capacity 114 by the first client $102_A$ and may be exchangeable. For example, the unutilized exchangeable capacity 114 by the traded to the second client $102_B$ as shown in FIG. 1 for a given consideration. For example, the exchangeable capacity 114 may be traded for a monetary amount or for another capacity portion to be provided to the first client $102_A$ at a different point or duration of time. Following exchanging the exchangeable capacity 114, the exchangeable capacity 114 is reallocated to the second client $102_B$ and no longer available for use by the first client $102_A$.

Figure 2:
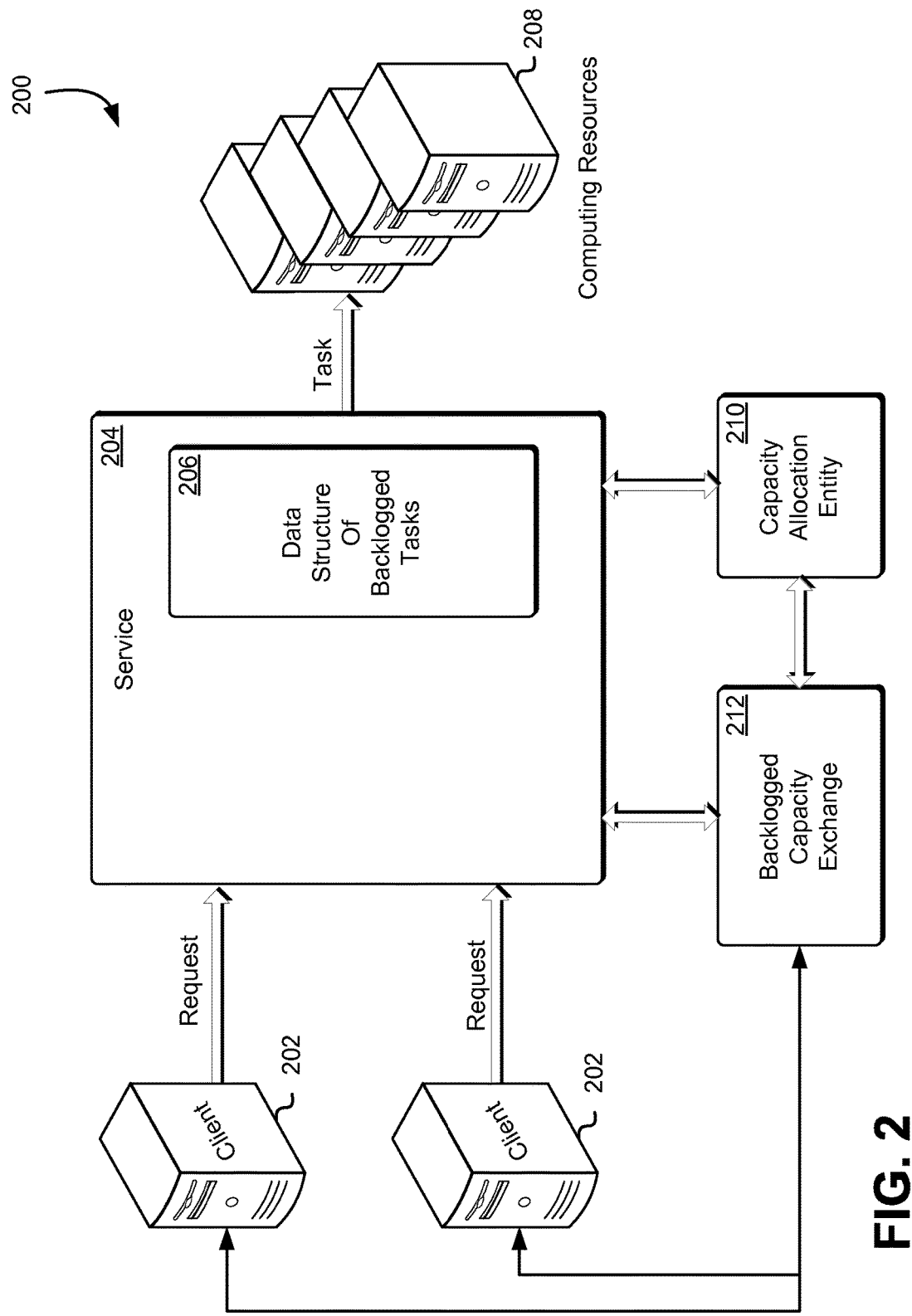
FIG. 2 shows an example of an environment having a backlogged work capacity exchange in accordance with at least one embodiment.

FIG. 2 shows an example of an environment having a backlogged work capacity exchange in accordance with at least one embodiment. In the environment 200, a plurality of clients 202 (singularly referred to herein as client 202) of a service 204 are shown. The service 204 may be any entity that is configured to perform computing operations (for example, that are requested by the plurality of clients 202). The service 204 is associated with one or more computing resources 208. The computing resources 208 may include computational resources, memory and storage resources or networking resources. Examples of the computational resources include computer systems and servers. Furthermore, examples of the memory and storage resources include storage devices, such as optical drives and solid state drives and examples of the networking resources include routers and network cards, among others. The computing resources 208 of the service 204 may be individually or collectively configured to provide computing functionality to the plurality of clients 204, whereby a client 202 may be a user or a customer of the service 204.

As described herein, the service 204 may be a data storage service and may be configured to store data (for example, computer-readable files) of a client 202 in a storage location that is remote in relation to the client 202. Furthermore, the storage may be accessible by the client over a network, such as the Internet or an intranet. A request made by the client 202 (such as a request to upload a file) may be received by the service 204. The request may be accepted by the service 204. If the request is accepted, computing work may be required to be performed by the service 204 or another entity to satisfy the request. The computing work may include any type of computing operation performed to satisfy the request. The computing operations may include memory access operations or arithmetic or logical operations, among many others. Furthermore, the computing work may be an execution workflow that includes parallel or sequential computing tasks, whereby a computing task may include one or more operations. Execution of the computing operations may be backlogged pending computing resources 208 becoming available to take up their execution. Accordingly, execution of the computing operations may be performed asynchronously in relation to a received request.

Other examples of the service 204 include an access control service. The access control service may be configured to manage access to the client's 202 remotely-hosted computing resources. For example, if the client 202 is an organization having a number of users that access its remotely-hosted computing resources, the access control service may be configured to manage permissions given to the users. The permissions may specify a level of access to the computing resource that is granted to a user or actions that a user is permitted to take. The client 202 may request that changes be made to existing access controls or that new access control policies by instituted. The access control service may accept and acknowledge the request. Acceptance of the request may prompt or set off the performance of one or more computing tasks (for example, asynchronously in relation to the request) to satisfy the request. The execution of the one or more tasks may be backlogged as described herein. Furthermore, a priority associated with the request, the client 202 issuing the request or one or more computing tasks may dictate when execution of the one or more computing tasks may be taken up by the computing resources. Conversely, if the request was denied, for example, due at least in part to the client 202 having exceeded an allowable quota of requests or backlogged tasks, the service 204 may deny the request, and, accordingly, the one or more task may not be enqueued for execution.

As described herein, the client 202 may be any entity that is configured to submit requests to the service 204. In various embodiments, the client 202 may be a subscribing customer of the service 204, whereby the customer may pay for use of the service 204 or may be entitled to certain use of the service without charge. Furthermore, the client 202 may be another service of a remote computing environment. The client 202 may be configured to request (for example, by sending an application programming interface (API) function call) the service 204 to perform one or more computing operations. Examples, of the computing operations include modifying the access privileges of a group of users of the client 202, uploading to a file for storage to an off-premises storage service or retrieving the file from storage and instantiating a remotely-hosted virtual computer system, among many others. The client 202 may be an administrator or a principal of an organization having an account with the service 204 or otherwise authorized to utilize the service 204. The client 202 may interact with or access the service 204 (for example, by sending API configured function calls and receiving responses from the service 204) using any type of computer.

Upon receipt of the request from the client 202, the service 204 may evaluate the request and determine whether to accept or deny the request. If the service 204 accepts the request, the service 204 may send a message to the client 202 indicating acceptance of the request, whereby the message may be an acknowledgement. If the service 204 denies the request, the service 204 may send a message to the client 202 indicating denial of the request. Furthermore, an indication of one or more reasons for denial of the request may be sent in connection with the message. Furthermore, if the denial is temporary or if the one or more reasons for denial are transient, an indication of a time at which the request may be accepted may be provided in connection with the message. Furthermore, if there are a set of conditions whose satisfaction results in the request being accepted, an indication of the set of conditions may be provided in connection with the message.

Acceptance of the request may trigger the performance of one or more tasks by the service 204 or other entities, such as the computing resources 208 shown in FIG. 2. Because the service 204 or computing resources 208 may be capacity-constrained, the execution of the one or more tasks may not be initiated immediately following acceptance of the request. Instead, the one or more tasks may be held awaiting the availability of computing resources 208 to start their execution or complete various stages of their execution. As shown in FIG. 2, the service 204 includes a data structure of backlogged tasks 206. The data structure of backlogged tasks 206 may be any type of data structure, such as a queue or a database, among others, that is configured to store an indication of one or more backlogged task. The data structure of backlogged tasks 206 may store an identity associated with the one or more tasks pending execution, an identity of the request triggering performance of the one or more tasks, an identity of the client 202 initiating the request, among others. Furthermore, the data structure of backlogged tasks 206 may store an indication of one or more conditions under which the request was submitted. The conditions may include an allocated computing capacity (for example, quota or limit) associated with the client at the time of request submission. When the computing resources 208 become available to execute one or more tasks of the data structure of backlogged tasks 206, an entry associated with the one or more tasks may be removed from the data structure of backlogged tasks 206 as a result of the commencement or conclusion of the execution of the one or more tasks by the computing resources 208.

The amount of outstanding computing work in the environment 200 may be limited to a maximum amount. Limiting the outstanding computing work may include limiting the number of outstanding tasks retained in the data structure of backlogged tasks 206 pending execution to a maximum number. The amount of time that one or more tasks are to be retained pending execution may be also be limited as described in co-pending U.S. patent application Ser. No. 14/314,315 entitled "MANAGING BACKLOGGED TASKS", which is incorporated by reference herein.

The amount of outstanding computing work may be subdivided and allocated to each client 202 of the plurality of clients 202 of the service 204 or to groupings of clients 202. The allocated amount of computing work may be reserved for use by each client 202. When a client 202 meets or exceed their allocated quota of outstanding computing work, requests of the client 202 whose satisfaction is contingent upon computing tasks being performed may be rejected. Furthermore, the amount of outstanding computing work may also be segmented and allocated to various priority designations associated of the requests or computing tasks resulting from the requests.

A capacity allocation entity 210 is shown in FIG. 2. The capacity allocation entity 210 may be one or more computing resources that are individually or collectively configured to allocate a maximum capacity of outstanding computational work of the service 204 among clients 202 of the service 204. The maximum capacity may be a limit on an amount computational work that may be retained pending execution. The maximum capacity may be a number of requests (for example, web service requests) that may be retained pending execution. Furthermore, the maximum capacity may be determined as a number of computing operations (such as memory access operations or arithmetic or logical operations) or an approximation thereof that may be retained pending execution.

Further, the capacity may be allocated among categories of request or categories of computing tasks. For example, if the service 204 has one hundred clients 202, each client may be allocated one percent of the backlogged work capacity. By way of another example, if the service 204 has twenty clients 202 that pay fees for utilizing the service and twenty clients 202 that utilize the service 204 free of charge, the backlogged work capacity may divided such that each paying client 202 receives four percent of the backlogged work capacity, whereas each non-paying client 204 receives one percent of the backlogged work capacity. The capacity allocation entity 210 may allocate the backlogged computing work capacity and send an indication of the allocation to the service 204. The service 204 may utilize the allocation to determine whether to accept or reject requests that are received from the plurality of clients 202.

A backlogged capacity exchange 212 is provided in the environment 200. The backlogged capacity exchange 212 may be utilized to exchange allocated backlogged computing work capacity between clients 202 of the service 204. Clients 202 may exchange allocated backlogged computing work capacity between one another in exchange for a monetary payment. Furthermore, a client 202 having an allocated unutilized capacity may give the capacity to another client and may receive in exchange some or all of the backlogged computing work capacity of the other client at a later point in time. Clients 202 may communicate with the backlogged capacity exchange 212 to obtain needed backlogged computing work capacity. For example, a client 202 may identify that the client 202 does not have an available allocated capacity for a request to be satisfied. The client 202 may send a request to the backlogged capacity exchange 212 to obtain backlogged work capacity. The request to obtain backlogged work capacity, which may be an API configured function call, may include of the amount of backlogged work capacity that is sought to be obtained as well as a bid indicating a monetary amount or other exchangeable good or service provided by the client 202 in exchange of receipt of the requested backlogged computing work capacity. As described herein, presently available backlogged work capacity may be exchanged for backlogged work capacity at a later point in time.

The backlogged capacity exchange 212 may match a received bid offer from a first client with a received ask offer from a second client. If the backlogged capacity is exchanged, the backlogged capacity exchange 212 may send an indication of the exchange to both clients 202. Furthermore, the backlogged capacity exchange 212 may send an indication of the exchange to the service 204. Either or both indications may include an identifier associated with the exchanged backlogged capacity, whereby every exchange of backlogged capacity settled by the backlogged capacity exchange 212 may be associated with a unique identifier. Having obtained additional backlogged capacity, the client 202 may send a request to the service 204 for the performance of one or more computing operations. If additional backlogged capacity beyond that available to the client is need for satisfying the request, the client 202 may also submit in connection with the request the unique identifier. The unique identifier may be used by the service 204 to confirm that the client 202 has in fact obtained the required backlogged work capacity using the backlogged capacity exchange 212. For example, the service 204 may retain a database table identifying the amount of capacity allocated to clients 202 of the service 204. If backlogged computing work capacity is exchanged between the clients 202, the service 202 may adjust the database table to credit the obtained capacity to one client while reducing the available capacity of another client by the same amount. Thus, the service 204 may track the capacity available to the service's 204 clients 202.

As an alternative to communicating with the backlogged capacity exchange 212 to obtain needed backlogged work capacity, the client 202 may submit to the service 204 a request to obtain the backlogged capacity. The request to obtain the backlogged capacity may be submitted in connection with the request to perform the one or more computational operations, which may be an API function call. For example, the API function call may include a field specifying that additional required capacity is to be obtained using the backlogged capacity exchange 212. Furthermore, the API function call may indicate consideration in exchange for the received capacity. The consideration may include a maximum monetary amount or an indication of a time at which the client's 204 capacity may be given back in exchange of the received capacity, among others. The service 204 may be configured to communicate with the backlogged capacity exchange 212 to obtain the sought backlogged work capacity.

Figure 3:
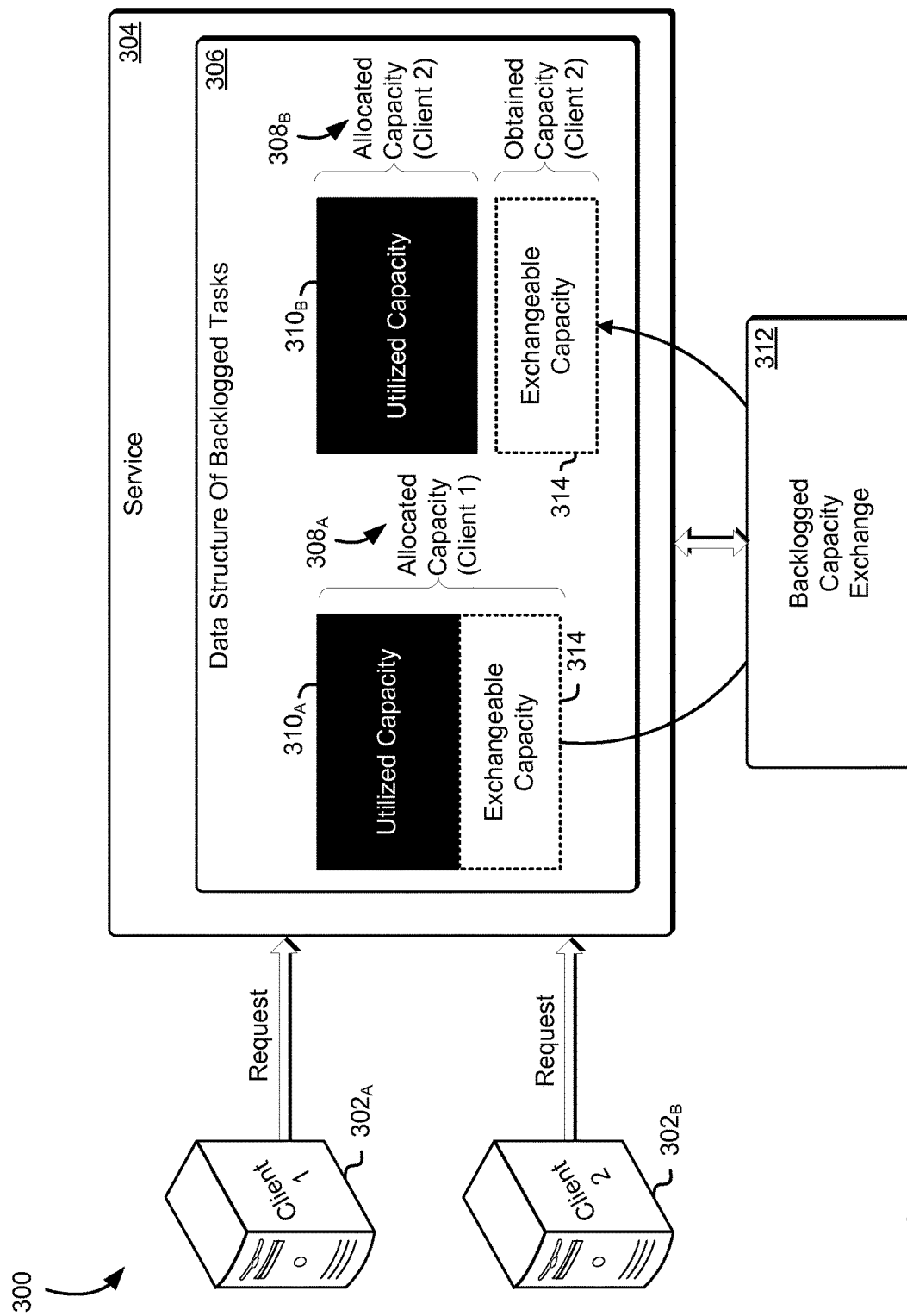
FIG. 3 shows an example of an environment for exchanging capacity in accordance with at least one embodiment.

FIG. 3 shows an example of an environment for exchanging capacity in accordance with at least one embodiment. In the environment 300, a plurality of clients (denoted as "client 1" and "client 2" and referred to individually herein as first client $302_A$ and second client $302_B$, respectively, and collectively herein as clients 302) communicate with a service 304 that is associated with a backlogged capacity exchange 312. The service 304, which is similar to the service 204 described with reference to FIG. 2, includes a data structure of backlogged tasks 306 that is similar to the data structure of backlogged tasks 206 described with reference to FIG. 2. The data structure of backlogged tasks 306 retains for a client 302 of the plurality of clients one or more tasks that are pending execution by the service 304 or other computing resources. A task may be enqueued pending a computing resource becoming available for executing the task or pending completion of execution of another task having a higher priority than the task.

The data structure of backlogged tasks 306 may be associated with a total capacity. The total capacity may be measured by a maximum number of computing tasks that are permitted to be retained in the data structure 306 awaiting execution. Furthermore, a task may be associated with various computing loads, whereby a computing load may be a measure of units of computing work required to perform the task. The units of computing work may include a number of commands that are executed to complete the task. Units of computing work may be measured in a number of computing operations that are to be performed to complete the task. The computing operations may include a number of input/output (I/O) operations or a number of memory access operations (such as, a number of memory reads or memory writes). Further, computing operations may include additions, subtractions, divisions and the like. In addition, computing work may be measured by a number of clock cycles or execution threads of a processor required to complete the task. Computationally intensive tasks may be associated with a greater amount of computing work than other tasks that are less computationally intensive.

The data structure of backlogged tasks 306 may be configured with a total capacity. The total capacity may be established such that a specified quality-of-service (QoS) or service-level agreement (SLA) is met. The service 304 may reject client requests when the total capacity is met or exceeded and, absent overriding the total capacity configuration, only accepts requests when there is available capacity to execute tasks resulting from a request. Because the total capacity of the data structure of backlogged tasks 306 is finite predictable latency in fulfilling client requests may be ensured as described in co-pending U.S. patent application Ser. No. 14/314,315 entitled "MANAGING BACKLOGGED TASKS", which is incorporated by reference herein.

A portion of the total capacity of the data structure of backlogged tasks 306 may be allocated to a client 302 of the service 304. The capacity that is allocated to a client 302 may be reserved for computing tasks resulting from requests submitted by the client 302. In some embodiments, the capacity may be evenly divided among the plurality of clients 302. Furthermore, the capacity may be sold or leased to clients 302. Certain categories of clients 302 (such as paying clients) may be allocated a different capacity, for example, a larger capacity, than other clients, such as clients associated with a lower-tiered subscription to the service 304. In addition or as an alternative to allocating the capacity to the clients 302, the total capacity may also be subdivided and distributed to different types of requests. Requests may be categorized depending on their priority. For example, the different categories may include high priority, medium priority and low priority. The total capacity may be allocated between the request categories irrespective of the client initiating the request. Furthermore, capacity that is allocated to a client 302 may be further subdivided among the various request categories of the client 302.

As shown in FIG. 3, the first client $302_A$ is allocated a first allocated capacity $308_A$, and the second client $302_B$ is allocated a second allocated capacity $308_B$. A portion of the first allocated capacity $308_A$ (denoted as utilized capacity $310_A$) is shown to be utilized by the first client $302_A$. For example, one or more requests that were issued by the first client $302_A$ may have resulted in one or more tasks that are retained in the data structure of backlogged tasks 306 pending execution. Performance of the one or more tasks may require an amount of computing work that does not exceed the first allocated capacity $308_A$. The remainder of the first allocated capacity $308_A$ (denoted as exchangeable capacity 314) may be unused by computing tasks resulting from requests issued by the first client $302_A$. The exchangeable capacity 314 may be traded with the second client $302_B$. All of the second client's $302_B$ allocated capacity $308_B$ is shown in FIG. 3 to be utilized by tasks of the second client $302_B$. Because the second client's $302_B$ allocated capacity $308_B$ is fully utilized, the second client $302_B$ may not have available capacity for backlogging additional tasks pending execution. Accordingly, unless the second client's $302_B$ capacity is increased, requests of the second client $302_B$ whose satisfaction requires backlogging tasks for execution may be denied.

The exchangeable capacity 314 that is unused by the first client $302_A$ may be traded with the second client $302_B$. As described herein, the backlogged capacity exchange 312 may facilitate transferring the exchangeable capacity 314 from the first client $302_A$ to the second client $302_B$. The capacity 314 may be reallocated to the second client $302_B$ indefinitely (for example, for the entirety of the length of time that the first client $302_A$ is a client of the service 304) or for a limited period of time, such as one hour. The capacity 314 may be provided to the second client $302_B$ in exchange for a monetary amount (such as monetary fee per unit of computing work). Furthermore, the capacity 314 may be provided to the second client $302_B$ in exchange for the first client $302_A$ receiving back the same capacity or a different capacity from the second client $302_B$ or another entity at a later point time. The backlogged capacity exchange 312 may match bid and ask offers presented by the first client $302_A$, second client $302_B$ and other clients. A bid offer may specify a monetary amount that a purchaser of capacity is willing to pay for receiving the capacity and an ask offer may specify an amount that a seller is willing to take for selling the capacity. Capacity may also be exchanged in a secondary marketplace other than the backlogged capacity exchange 312. Furthermore, a capacity marketplace may enable clients to buy or sell options for capacity, futures or swaps. In various embodiments, the service 304 may retain additional capacity of backlogged computing work and may offer the capacity for sale to clients 302 requiring additional capacity.

In various embodiments, the clients 302 of the service 304 may be computing services of a computing resource service provider. The computing resource service provider may be configured to provide remote or network-based computing functionality. Each of the computing services may be automatically configured to request additional computing capacity if its associated available capacity is not sufficient for required backlogged computing work. The computing services may exchange capacity with one another, such that a first service may receive the computing capacity of a second service at a particular point in time in exchange for foregoing capacity for a duration of time in the future.

Figure 4:
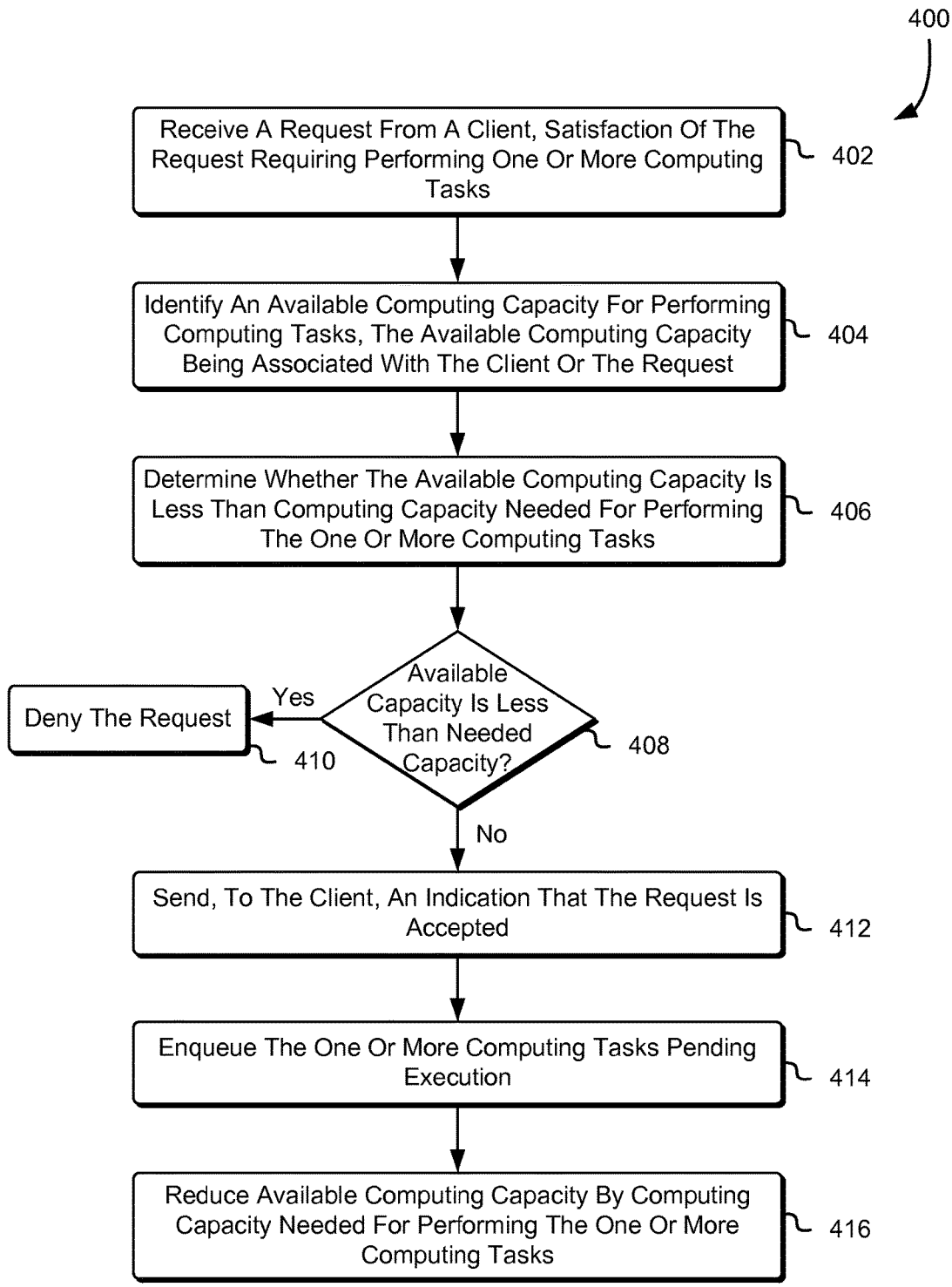
FIG. 4 shows an example of a method for backlogging computing tasks in accordance with at least one embodiment.

FIG. 4 shows an example of a method for backlogging computing tasks in accordance with at least one embodiment. In the process 400, a service, such as the service 204 described with reference to FIG. 2, receives 402 a request from a client, whereby satisfaction of the request requires performing one or more computing tasks. The service then identifies 404 an available computing capacity for performing computing tasks, whereby the available computing capacity may be associated with the client or the request. As described herein, the client or a grouping of clients may be allocated computing capacity. The client or the grouping of clients to which the client submitting the request belongs may utilize some or all of the allocated computing capacity. It is noted that identifying an available computing capacity for performing computing tasks may include determine an amount of computing capacity unused by the client. The service may identify the capacity using entries of a data structure of backlogged tasks, such as the data structure of backlogged tasks 306 described with reference to FIG. 3. As described herein, the data structure of backlogged tasks may retain, for each task pending execution, an amount of computing work required to execute the task as well as an identity associated with the requestor of the task (for example, the client), a grouping of task requestors or priority level of the request triggering execution of the task. The sum total of computing work amounts for the client may represent the utilized capacity, whereas the difference between the sum total and the capacity allocated to the client may represent the available computing capacity. The capacity allocated to the client may be provided to the service by a capacity allocated entity, such as the capacity allocated entity 210 described with reference to FIG. 2. The capacity allocated to clients of the service may be stored by the service in a database table, among other types of data structures.

The service then determines 406 whether the available computing capacity is less than computing capacity needed for performing the one or more computing tasks. For example, it may be determined whether the unused allocated capacity is sufficient for the one or more computing tasks or whether the amount of computing work required for executing the one or more computing tasks exceeds those available for use. If the service determines 408 that the available capacity is less than the capacity needed to execute the one or more computing tasks, the service denies 410 the request. For example, the service may send to the client an indication that the available capacity for performing backlogged computing tasks available to the client is less than that needed to execute the tasks associated the request. Denying the request may be performed synchronously in relation to receipt of the request from the client.

Conversely, if the service determines 408 that the available capacity is not less than the capacity needed to execute the one or more computing tasks, the service sends 412 an indication that the request is accepted to the client. Similar to denying the request, sending the indication to the client may also be performed synchronously in relation to receipt of the request from the client. The service also enqueues 414 the one or more computing tasks pending execution. Enqueuing the one or more computing tasks may include adding an entry associated with the one or more tasks in the data structure of backlogged tasks 306. To account for utilization of the computing capacity as a result of enqueuing the one or more computing tasks, the service reduces 416 available computing capacity by computing capacity needed for performing the one or more computing tasks. As described herein, a database table of the service may include entries that specify, for each client, an allocated capacity and a utilized capacity. The utilized capacity may be increased by the computing capacity needed for performing the one or more computing tasks. Accordingly, the available capacity for clients of the service may be tracked at different periods of time.

Figure 5:
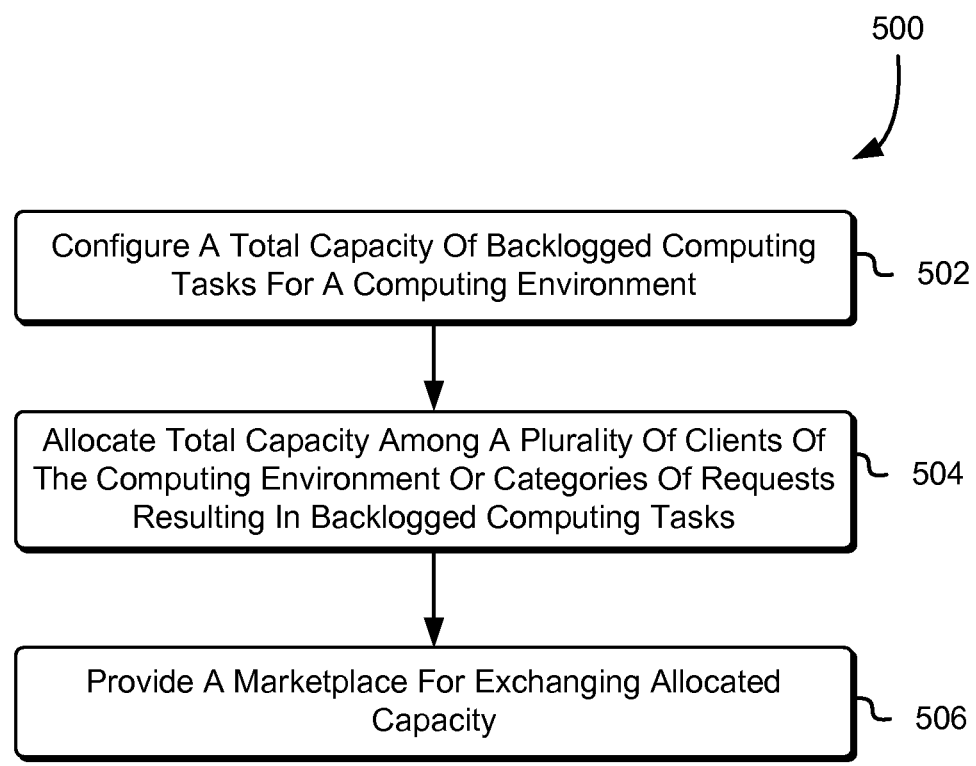
FIG. 5 shows an example of a method for enabling capacity exchange in accordance with at least one embodiment.

FIG. 5 shows an example of a method for enabling capacity exchange in accordance with at least one embodiment. In the process 500, a service, such as the service 204 described with reference to FIG. 2, configures 502 a total capacity of backlogged computing tasks. The total capacity may be configured in a variety of ways. For example, the total capacity may be dynamically configured such that a time that the earliest pending task has been pending in a data structure of backlogged tasks, such as the data structure of backlogged tasks 306, does not exceed a specified time limit as described in co-pending U.S. patent application Ser. No. 14/314,315, filed on Jun. 25, 2014, entitled "MANAGING BACKLOGGED TASKS," which is incorporated by reference herein.

The total capacity may be throttled, for example, by reducing the allocated capacity to service clients, if the time that the earliest pending task has been pending exceeds the specified time limit. The rate at which tasks are removed from the data structure of backlogged tasks may be dependent upon computing capability of the computing resources used to execute the tasks. As the computing power of the computing resources increases, the rate at which tasks are executed and removed from the data structure of backlogged tasks also increases. Accordingly, the total capacity of the data structure of backlogged tasks may be increased while latency (for example, as measured by the amount of time a task remains pending execution) may be kept at a desirable level. Conversely, if the computing power of the computing resources is reduced, the total capacity would, accordingly, need to be reduced in order to maintain the sought after latency.

The service then allocates 504 the total capacity among a plurality of clients of the computing environment or among categories of requests resulting in backlogged computing tasks. As described herein, the total capacity may be allocated in a number of ways, whereby each client or category of requests, among others, may be allotted a portion of the total capacity for their use. The service or another entity also provides 506 a marketplace for exchanging allocated capacity. If a client, such as another service of a remote computing environment, is apportioned backlogged capacity in exceed of their present need, the client may sell or exchange the capacity through a backlogged capacity exchange, such as the backlogged capacity exchange 312 described with reference to FIG. 3, or other marketplaces, such a secondary marketplace. Traded capacity may be associated with an identifier. The identifier, which may, for example, be a settlement identifier, may be used by the service or an entity thereof, such as the data structure of backlogged tasks 306 described with reference to FIG. 3, to confirm that the capacity was exchanged.

Providing the marketplace for exchanging allocated capacity may include providing user interface (for example, a portal or another type of graphical user interface (GUI)) that is usable by clients of the service to trade capacity. Principals associated with service clients (such as administrators of organizations) may utilize the user interface to place ask offers for their allocated capacity. An ask offer may specify a consideration to be received in exchange for obtaining the allocated capacity or a portion thereof. The consideration may be a monetary amount or an amount of capacity to be provided in exchange for the capacity. The interface may also be used to specify a time period during which the capacity is to be traded. Following the expiration of the time period, the capacity may be allocated back to the selling party. The user interface may provide an indication of the status of ask offers of the client and whether one or more of the ask offers have been matched with a bid offer received from another clients.

Similarly, the interface may be used by clients seeking to increase capacity available for their use. The interface may be used to list ask offers for capacity available for sale by clients of the service. Furthermore, details of the ask offers may also be provided such as a duration of time that a purchaser of the capacity may have the capacity allocated for their use and a monetary amount or other good or service to be provided in exchange for the capacity. A client seeking to obtain capacity may utilize the interface to select and purchase the capacity. Alternatively, as described herein, a request for performing one or more computing tasks submitted to the service may include a request for obtaining additional capacity. For example, if the capacity available to the client is not sufficient for the request for performing the one or more computing tasks to be satisfied, additional capacity may be obtained in accordance with the request.

Figure 6:
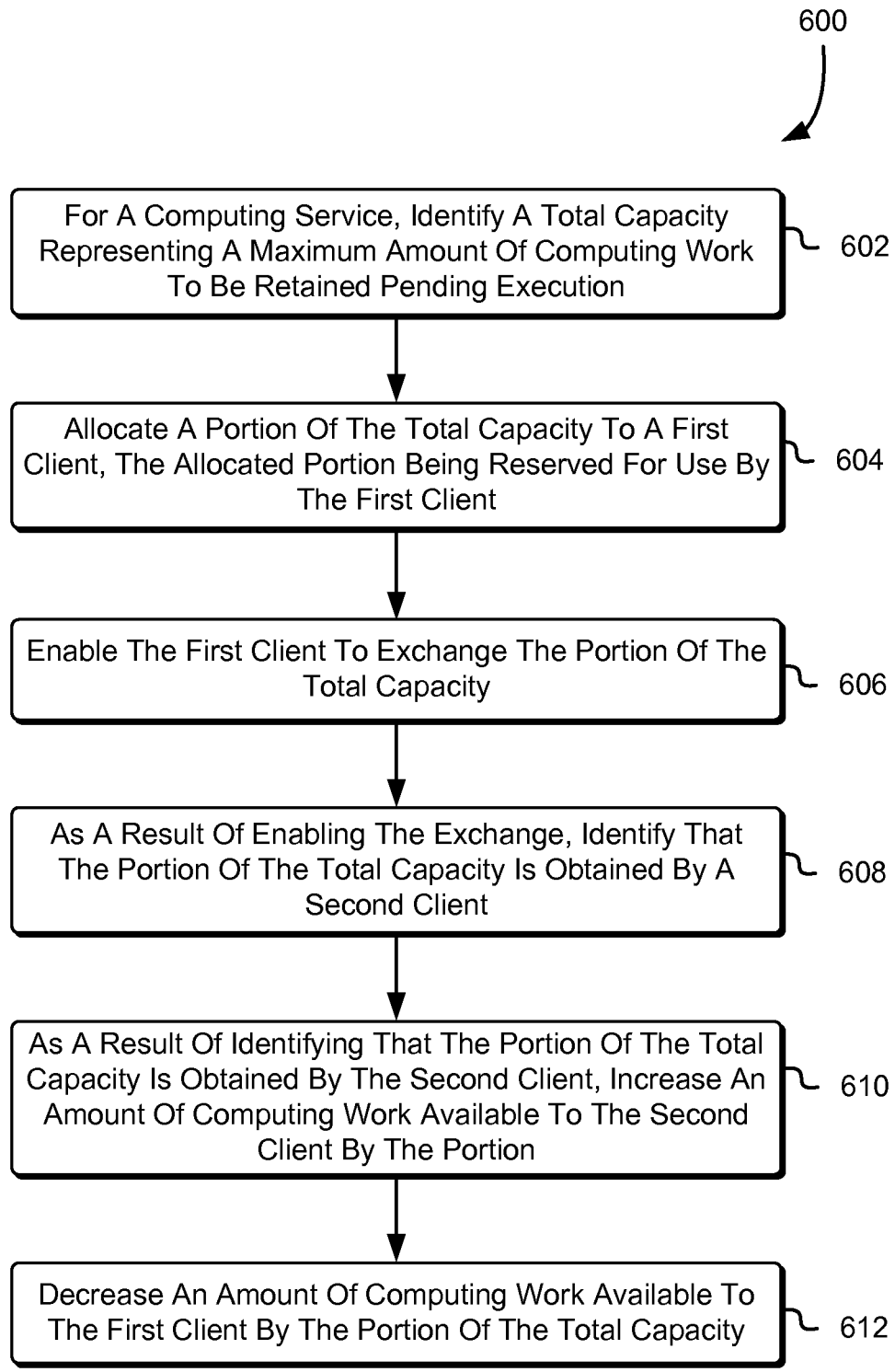
FIG. 6 shows an example of a method for exchanging backlogged computing capacity in accordance with at least one embodiment.

FIG. 6 shows an example of a method for exchanging backlogged computing capacity in accordance with at least one embodiment. In the process 600, a service, such as the service 204 described with reference to FIG. 2, identifies 602 a total capacity that represents a maximum amount of computing work to be retained pending execution. The total capacity may be configured to ensure that latency (or the amount of time that is required to perform computing operations) is predictable. The service then allocates 604 a portion of the total capacity to a first client, whereby the allocated portion may be reserved for use by the first client. A capacity allocation entity, such as the capacity allocation entity 210 described with reference to FIG. 2, may be configured to allocate the capacity and send an indication of the allocated capacity to the service, whereby the service may retain a database table or another type of data structure of allocated capacity amounts. Conversely, the database table or the other type of data structure may be retained by the capacity allocation entity. The capacity allocation entity may be configured to evenly allocate the capacity to clients of the service. Furthermore, a tier or category to which the client belongs may dictate the allocated capacity for the client. For example, clients belonging to some tiers may be allocated more of the service's capacity than clients belonging to other tiers.

The service also enables 606 the first client to exchange the portion of the total capacity. For example, the portion of the capacity may be exchange for a monetary amount, among others. A backlogged capacity exchange, such as the backlogged capacity exchange 212 described with reference to FIG. 2, may receive requests to purchase or sell capacity from clients. Upon matching a purchaser and seller, the backlogged capacity exchange may send a message to the service indicating the amount of backlogged computing work capacity exchanged as well as identities of both the purchaser and seller. Furthermore, the message may include a settlement identifier of the exchange. The service identifies 608 that the portion of the total capacity is obtained by a second client. The identification may be based at least in part on the received message.

The service may then reallocate the portion of the total capacity to the second client. The service increases 610 an amount of computing work available to the second client by the portion of the total capacity. Furthermore, the service decreases 612 an amount of computing work available to the first client by the portion of the total capacity. As described herein, the service may retain a database table of the capacity available to clients of the service, utilized by the clients of the service or allocated to the clients of the service. The database table may be adjusted to reflect the exchange. For example, an available capacity of the first client may be reduced by the portion of the total capacity. Furthermore, an available capacity of the second client may be reduced by the portion of the total capacity that is exchanged.

Figure 7:
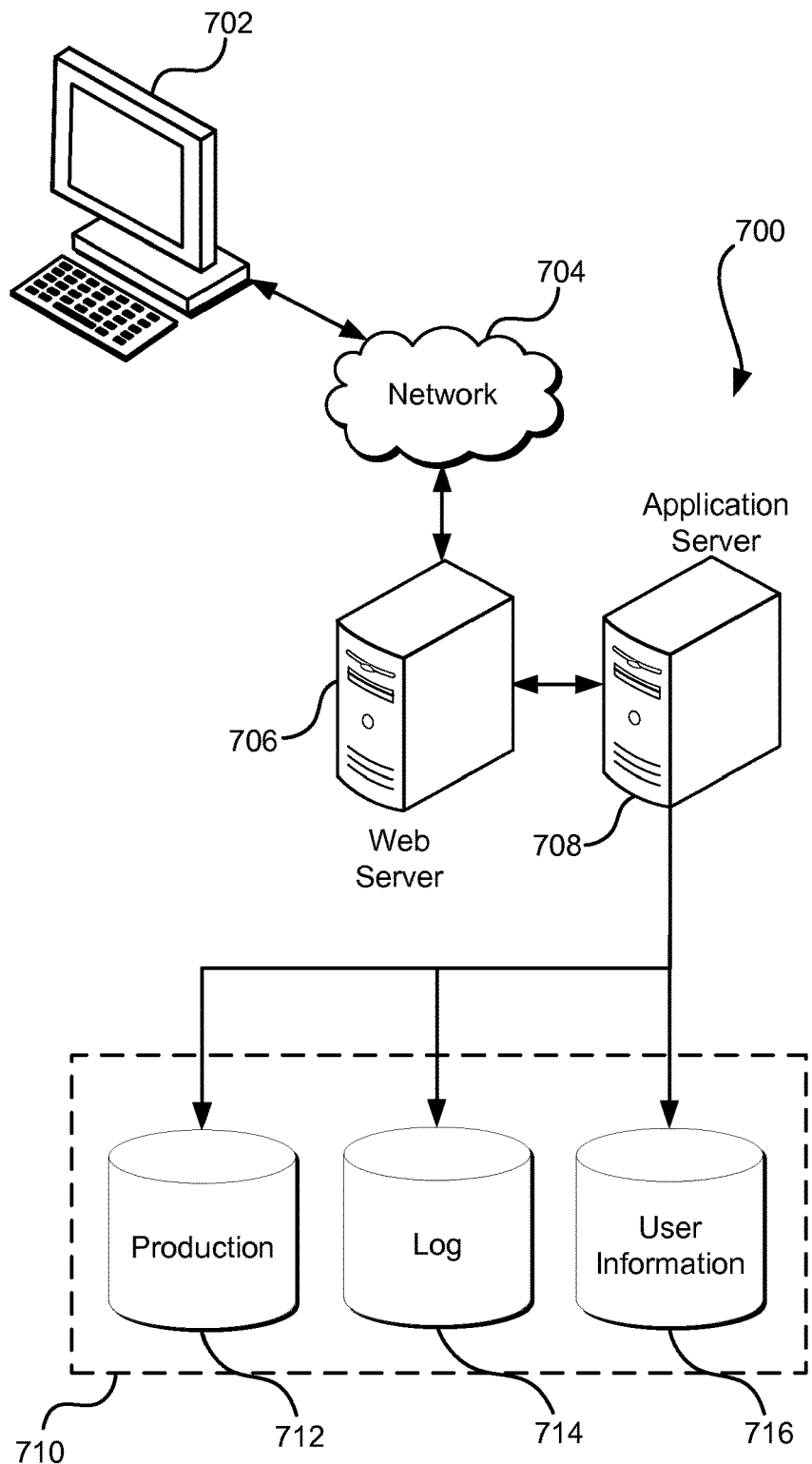
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    identifying a total capacity for a computing service, the total capacity representing a maximum amount of computing work pending execution by one or more computing resources and is dynamically configured based at least in part on submission times associated with computing work pending execution by one or more computing resources that has not exceeded a time limit;
    allocating a first portion of the total capacity to a first client, a subset of the first portion being reallocatable from the first client to a second client;
    obtaining a request from the second client, satisfaction of the request is associated with a capacity that exceeds a second portion of the total capacity;
    generating a determination that processing of the request complies with a set of conditions on exchange of the subset of the first portion of the total capacity to the second client, the set of conditions comprises a condition that is satisfied by;
        trading the subset of the first portion with the second client for a monetary amount and reallocating the subset of the first portion to the second client for a duration of an interval of time; and
        trading for another portion of the total capacity associated with the second client to be allotted to the first client at a future time; and
    processing the request based at least in part on the determination.

2. The computer-implemented method of claim 1, further comprising:
    enqueuing one or more computing tasks associated with the request as a result of accepting the request, the one or more computing tasks being enqueued pending execution by the one or more computing resources.

3. The computer-implemented method of claim 1, wherein the monetary amount comprises tokens that can be exchanged for portions of the total capacity.

4. The computer-implemented method of claim 1, further comprising:
- obtaining an ask offer from the first client, the ask offer specifying a first consideration to be received by the first client in exchange for reallocating the subset of the first portion of the total capacity to another client;
- obtaining a bid offer from the second client, the bid offer specifying a second consideration to be provided by the second client in exchange for reallocating the subset of the first portion of the total capacity to the second client; and
- determining that the subset of the first portion is reallocated to the second client is performed as a result of matching the ask offer with the bid offer.

5. A system, comprising:
- one or more processors; and
- memory to store executable instructions that, if executed by the one or more processors, cause the system to:
  - obtain a request, from a second client, satisfaction of the request requiring enqueuing computing work;
  - determine a queued computing work quota for a first client of a plurality of queued computing work quotas for use in enqueuing the computing work, wherein the queued computing work quota is dynamically configured based at least on part on queued computing work submission times not exceeding a time limit;
  - generate a determination that processing of the request complies with a set of conditions on exchange of a portion of the queued computing work quota from the first client to the second client, the set of conditions comprises a condition that is satisfied by:
    - trade the portion of the queued computing work quota with the second client for a monetary amount and reallocate the portion of the queued computing work quota to the second client for a duration of an interval of time; and
    - trade for another portion of the queued computing work quota associated with the second client to be allotted to the first client at a future time; and
  - process the request, based at least in part on the determination, for execution.

6. The system of claim 5, wherein the instructions further cause the system to:
- reallocate the portion of the queued computing work quota of the plurality of queued computing work quotas from the first client to the second client as a result of the portion of the queued computing work quota being traded from the first client to the second client and credit the first client with the monetary amount.

7. The system of claim 6, wherein the portion of the queued computing work quota is traded from the first client to the second client in exchange for another portion of a queued computing work quota to be reallocated from the second client to the first client.

8. The system of claim 5, wherein the instructions further cause the system to:
- obtain a bid offer for the queued computing work quota; and
- obtain an ask offer for the queued computing work quota.

9. The system of claim 8, wherein the instructions further cause the system to:
- reallocate the queued computing work quota on a condition that the bid offer is matched with the ask offer.

10. The system of claim 8, wherein:
- the bid offer indicates a monetary amount to be obtained in exchange for the queued computing work quota; and
- the instructions further cause the system to credit the monetary amount to the first client as a result of matching the bid offer with the ask offer.

11. The system of claim 8, wherein the instructions further cause the system to:
- obtain the request by obtaining the bid offer in connection with the request.

12. A non transitory computer readable storage medium comprising executable instructions that, as a result of being executed by one or more processors of a computer system, cause the computer system to at least:
- obtain, from a first client, a request, fulfillment of the request requiring enqueuing computing work pending execution;
  - determine an available enqueued computing work capacity associated with a second client for use in enqueuing the computing work pending execution, wherein the available enqueued computing work capacity is dynamically configured based at least on part on submission times associated with enqueueinq computing work pending execution not exceeding a time limit;
- reallocate a portion of the enqueued computing work capacity associated with a second client to the first client, after an expiration of a duration of time, as a result of obtaining an indication that the portion of the enqueued computing work capacity is traded from the first client to the second client for a monetary amount; and
- cause the request to be fulfilled, based at least in part on determining that processing of the request complies with a set of conditions on exchange of the portion of the enqueued computing work capacity from the second client to the first client; and
- fulfillment of the request utilizing the portion of enqueued computing work capacity for enqueuing the computing work.

13. The non-transitory computer-readable storage medium of claim 12, wherein the instructions further comprise instructions that, as a result of being executed by the one or more processors, cause the computer system to accept the request as a result of determining that an available enqueued computing work capacity associated with the first client that includes the portion of the enqueued computing work capacity is sufficient for enqueuing the computing work.

14. The non-transitory computer-readable storage medium of claim 13, wherein the request is accepted synchronously in relation to obtaining the request.

15. The non-transitory computer-readable storage medium of claim 12, wherein the instructions that cause the computer system to reallocate the portion of the enqueued computing work capacity further include instructions that cause the computer system to reallocate the portion of the enqueued computing work capacity for a second duration of time.

16. The non-transitory computer-readable storage medium of claim 15, wherein the instructions further comprise instructions that, as a result of being executed by the one or more processors, cause the computer system to allocate the portion of the enqueued computing work capacity back to the second client after the expiration of the second duration of time.

17. The non-transitory computer-readable storage medium of claim 12, wherein the instructions further comprise instructions that, as a result of being executed by the one or more processors, cause the computer system to obtain, from the first client, a bid offer for the portion of the enqueued computing work capacity indicating a monetary fee to be paid in exchange for the portion of the enqueued computing work capacity.

18. The non-transitory computer-readable storage medium of claim 17, wherein the instructions that cause the computer system to reallocate the portion of the enqueued computing work capacity further include instructions that cause the computer system to reallocate the portion of the enqueued computing work capacity as a result of matching the bid offer with an ask offer of the second client.

19. The non-transitory computer-readable storage medium of claim 12, wherein the instructions further comprise instructions that, as a result of being executed by the one or more processors, cause the computer system to:
- maintain an association between the first client and a first enqueued computing work capacity available to the first client; and
- increase the first enqueued computing work capacity by the portion of the enqueued computing work capacity as a result of the portion of the enqueued computing work capacity being traded from the second client to the first client.

* * * * *